United States Patent
Yu

(10) Patent No.: US 6,692,178 B2
(45) Date of Patent: Feb. 17, 2004

(54) PIVOTABLE TOOL HAVING CROSSING-CONNECTED ARMS

(76) Inventor: Hsiu-E Yu, No. 921-11, Section 2, Chung-Shan Road, Ta-Chia, Taichung (TW)

(*) Notice: Subject to any disclaimer, the term of this patent is extended or adjusted under 35 U.S.C. 154(b) by 0 days.

(21) Appl. No.: 10/118,897

(22) Filed: Apr. 10, 2002

(65) Prior Publication Data

US 2003/0194266 A1 Oct. 16, 2003

(51) Int. Cl.⁷ ................................................ F16C 11/00
(52) U.S. Cl. ........................... 403/85; 403/86; 403/87; 403/91; 403/92; 403/166; 81/462; 81/124.4; 81/124.5
(58) Field of Search ..................... 403/83–87, 91–96, 403/99, 164–166; 81/462, 124.4, 124.5, 124.7, 125.1, 177.2, 177.6

(56) References Cited

U.S. PATENT DOCUMENTS

| | | | | |
|---|---|---|---|---|
| 4,929,113 A | * | 5/1990 | Sheu | 403/157 |
| 5,039,118 A | * | 8/1991 | Huang | 28/47.371 |
| 5,123,768 A | * | 6/1992 | Franklin | 403/96 |
| 5,765,958 A | * | 6/1998 | Lan | 403/97 |
| 6,161,982 A | * | 12/2000 | Cole | 403/97 |
| 6,257,103 B1 | * | 7/2001 | Yu | 81/177.6 |

* cited by examiner

Primary Examiner—Lynne H. Browne
Assistant Examiner—Michael P. Ferguson
(74) Attorney, Agent, or Firm—Charles E. Baxley

(57) ABSTRACT

A pivotable tool includes a pair of pivotally interconnected arms disposed in a crossing relationship and having a manually releasable releasing device which locks the arms in a perpendicular open position for use of the tool as a wrench. In each of two ends of the two arms is mounted a socket. A collar is movably received between the two arms and is pushed to release a lock status by a releasing device.

2 Claims, 8 Drawing Sheets

PIVOTABLE TOOL HAVING CROSSING-CONNECTED ARMS

FIELD OF THE INVENTION

The present invention relates to a tool having two arms pivotally connected at middle thereof by a releasing device which is pressed to allow the two arms to be pivoted with each other.

BACKGROUND OF THE INVENTION

A conventional tool wrench for loosening bolts of tires generally includes two arms which are connected with each other in a crossing relationship and each one of two ends of the two arms is connected to a socket so that the user holds one arm to rotate the other arm to loosen bolts. A releasing device is used to interconnect the two arms so that when operating the releasing device, the lock status of the two arms is released and the two arms can be rotated with other to be a compact size by overlapping one arm onto the other, or to expand the two arms to be a cross shape. The releasing device is connected to the two arms by having multiple tiny grooves and holes defined in the arms so that springs and pins are engaged with these grooves and holes to connect the two arms by the releasing device. It is experienced that the cost for drilling these tiny holes and grooves is too high that the tools cannot be accepted by the markets. It is one of the main concerns to manufacture the tools by a simple structure and low manufacturing cost.

SUMMARY OF THE INVENTION

In accordance with one aspect of the present invention, there is provided a pivotable tool which comprises a first arm having a first passage and two grooves are defined in an inner periphery of the first passage. A second arm has a second passage defined through a middle thereof and two notches are defined in an inner periphery of the second passage.

A spring and a collar are received in the second passage and two lugs extend from an outer periphery of the collar. The two lugs are movably received in the two notches and the two grooves. A pin extends through the first passage, the second passage and the collar. A button is mounted on a first end of the pin and has two tongues which contact the two lugs of the collar.

The primary object of the present invention is to provide a pivotable tool that has simple structure and is easily manufactured so as to reduce the manufacturing cost.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
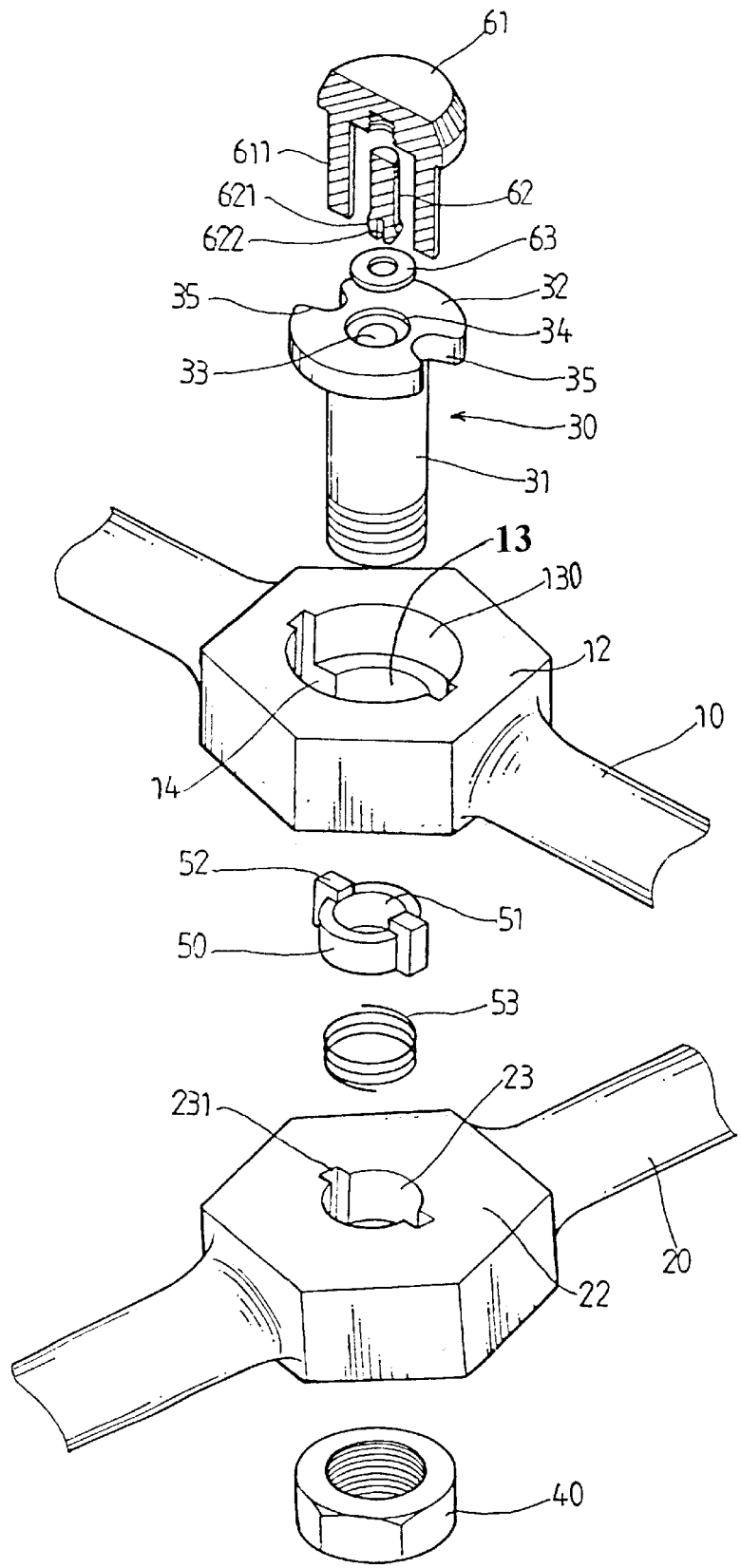
FIG. 1 is an exploded view to show a pivotable tool of the present invention.
Figure 2:
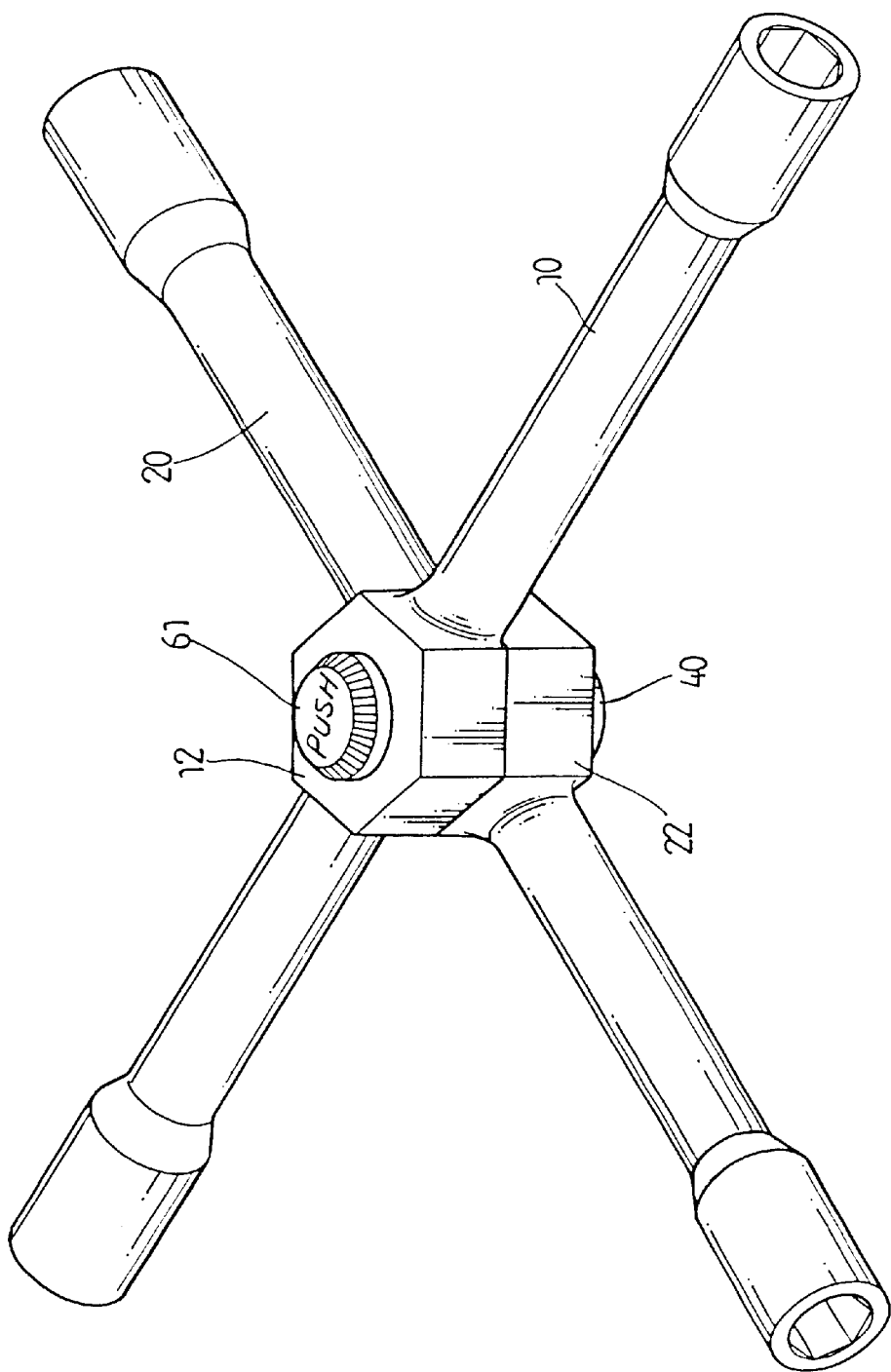
FIG. 2 is a perspective view to show the pivotable tool of the present invention.
Figure 3:
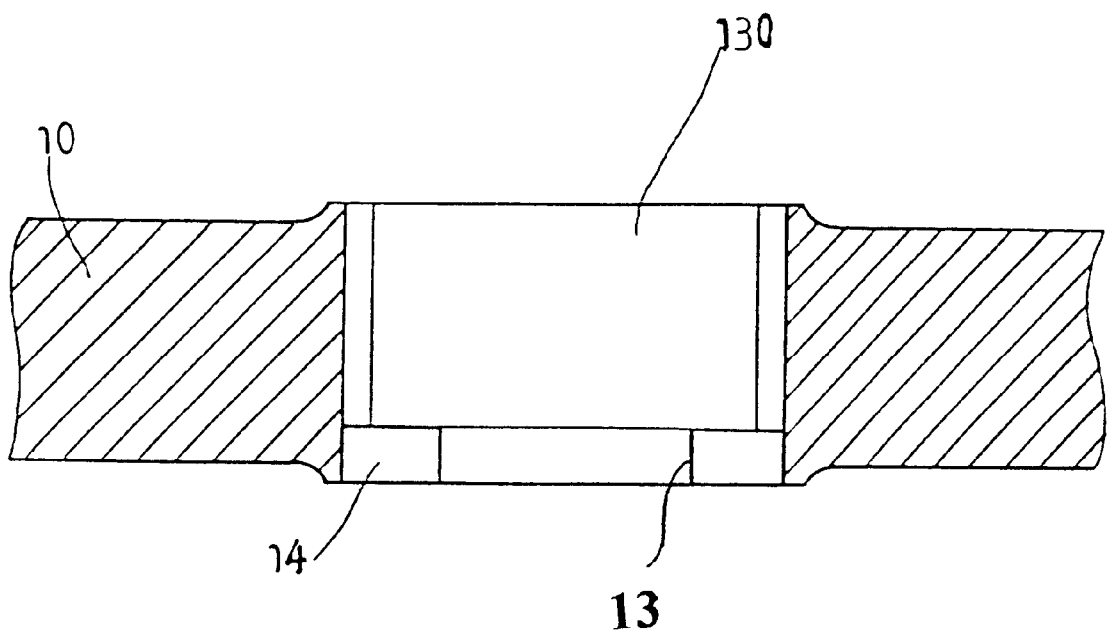
FIG. 3 is a cross sectional view to show the first arm of the pivotable tool of the present invention.
Figure 4:
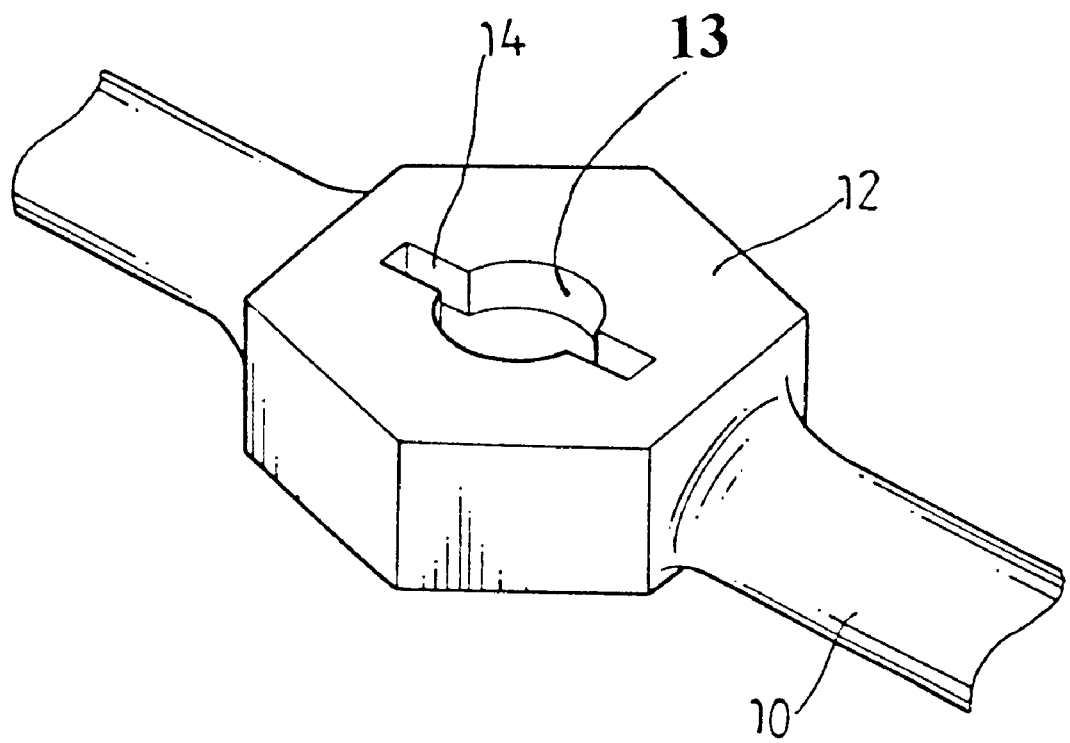
FIG. 4 is a perspective view to show the underside of the first arm of the pivotable tool of the present invention.

Referring to FIGS. 1, 2, 3 and 4, the pivotable tool of the present invention comprises a first arm 10 having a connection portion 12 at a middle thereof and a first passage 13 is defined through the connection portion 12. Two grooves 14 are defined in an inner periphery of the first passage 13 and an annular sink recess 130 is defined in the first arm 10 and communicates with the first passage 13.

Figure 5:
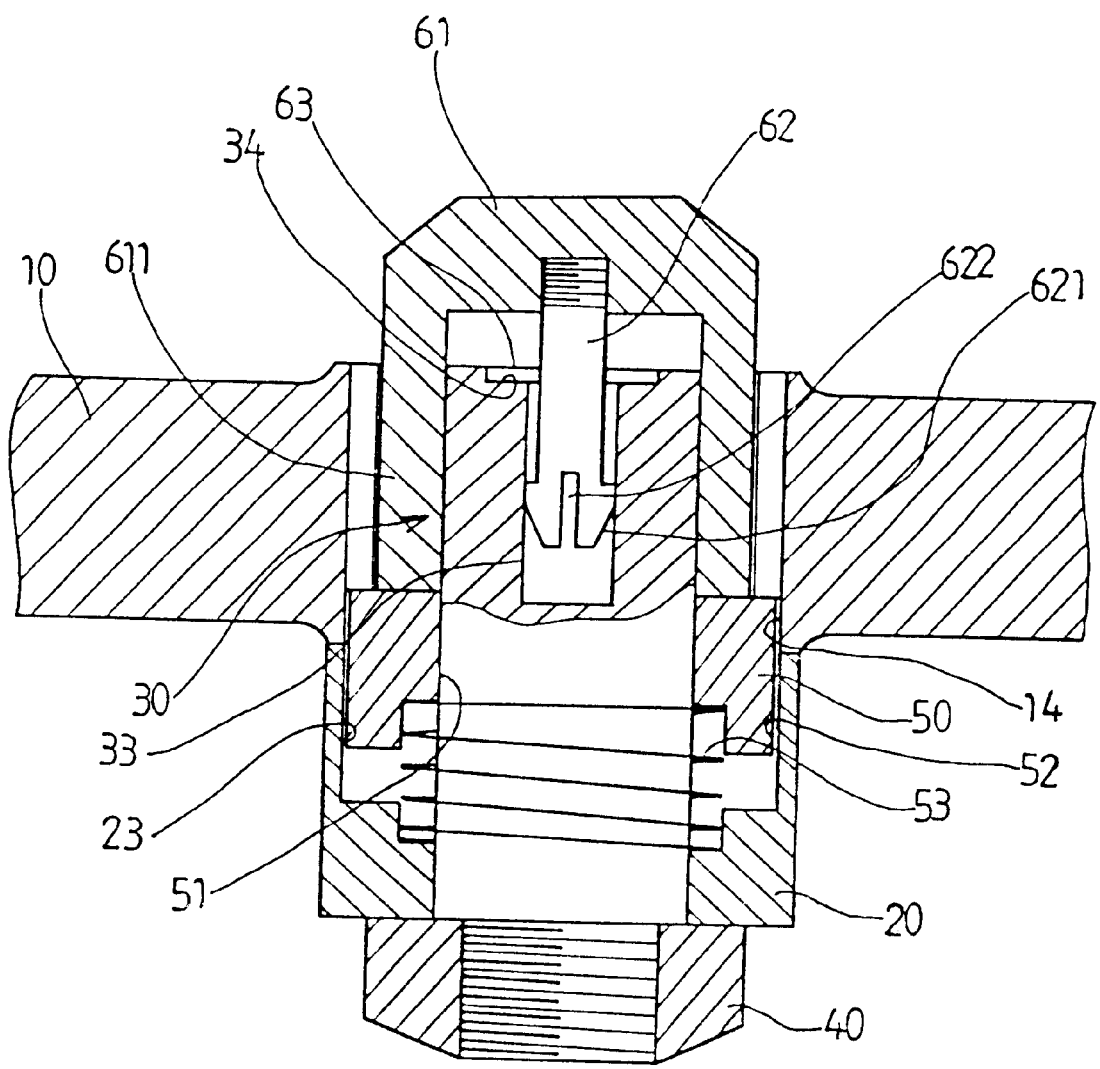
FIG. 5 is a cross sectional view to show the pivotable tool of the present invention.

Further referring to FIG. 5, a second arm 30 has a connection portion 22 at a middle thereof and a second passage 23 is defined through the connection portion 22. Two notches 231 and an annular step surface are defined in an inner periphery of the second passage 23.

A spring 53 and a collar 50 are received in the second passage 23 wherein the spring 53 is rested on the annular step surface and contacts the underside of the collar 50. Two lugs 52 extend from an outer periphery of the collar 50 and are movably received in the two notches 231 and the two grooves 14. A pin 30 extends through the first passage 13, the second passage 23 and the collar 50, and a nut 40 is threadedly connected to the threaded section of the shank 31 of the pin 30 below the connection portion 22 of the second arm 20. A flange 32 extends radially from a first end of the pin 30 and two concavities 35 are defined in the flange 32. The flange 32 of the pin 30 is received in the annular sink recess 130.

A button 61 is mounted on the first end of the pin 30 and has two tongues 611 which extends through the concavities 35 and contact the two lugs 52 of the collar 50. The first end of the pin 30 has a recess 33 and a rod 62 is threadedly connected to underside of the button 61 and inserted in the recess 33. Two hooks 621 extend from a distal end of the rod 62 and a slit 622 is defined between the two hooks 621 so that the two hooks 621 can be pushed close to each other. A ring 63 having a hole is securely engaged with a sink recess 34 in the top surface of the flange 32 and mounted to the rod 62. The two hooks 621 extend through the hole and a diameter of the hole of the ring 63 is smaller than the two hooks 621 so that the rod 62 is not disengaged from the pin 30.

Figure 6:
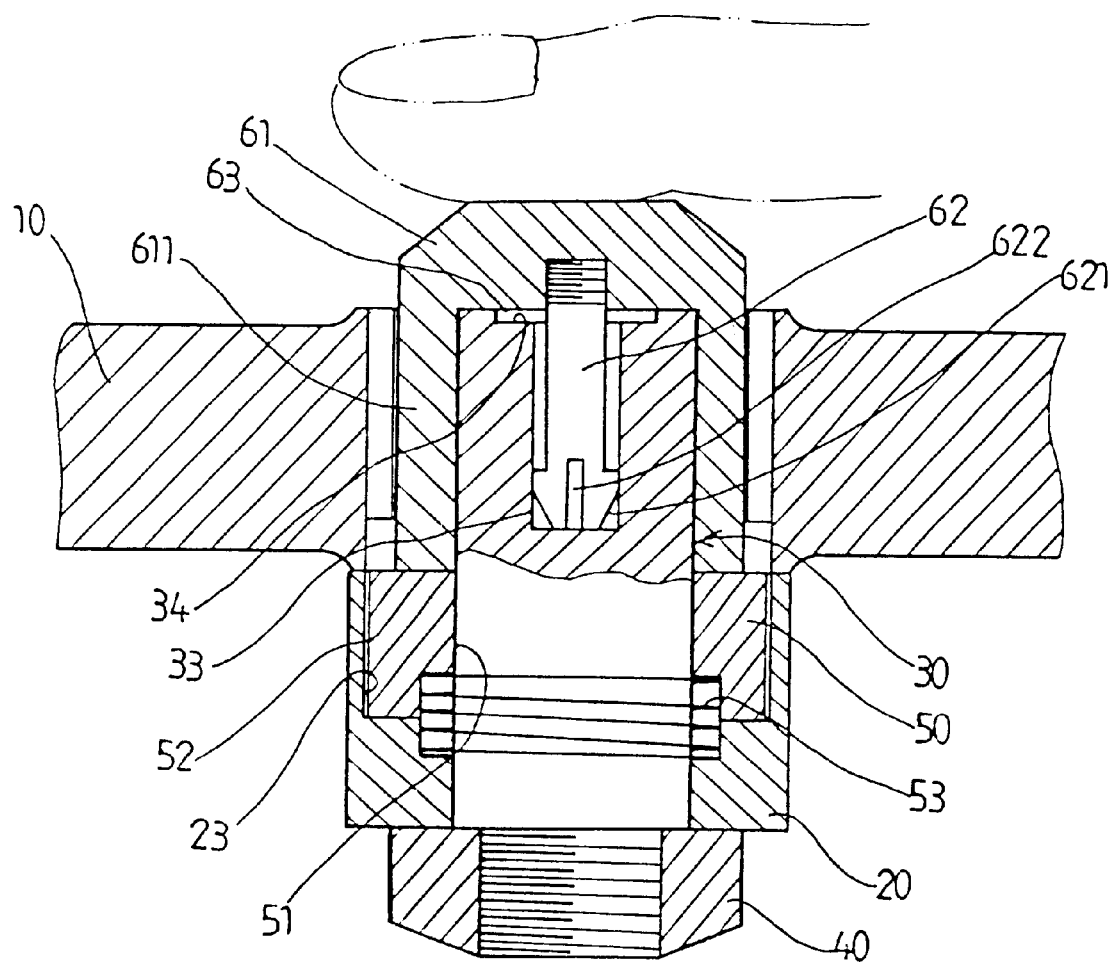
FIG. 6 is a cross sectional view to show the pivotable tool of the present invention wherein the button is pressed.
Figure 7:
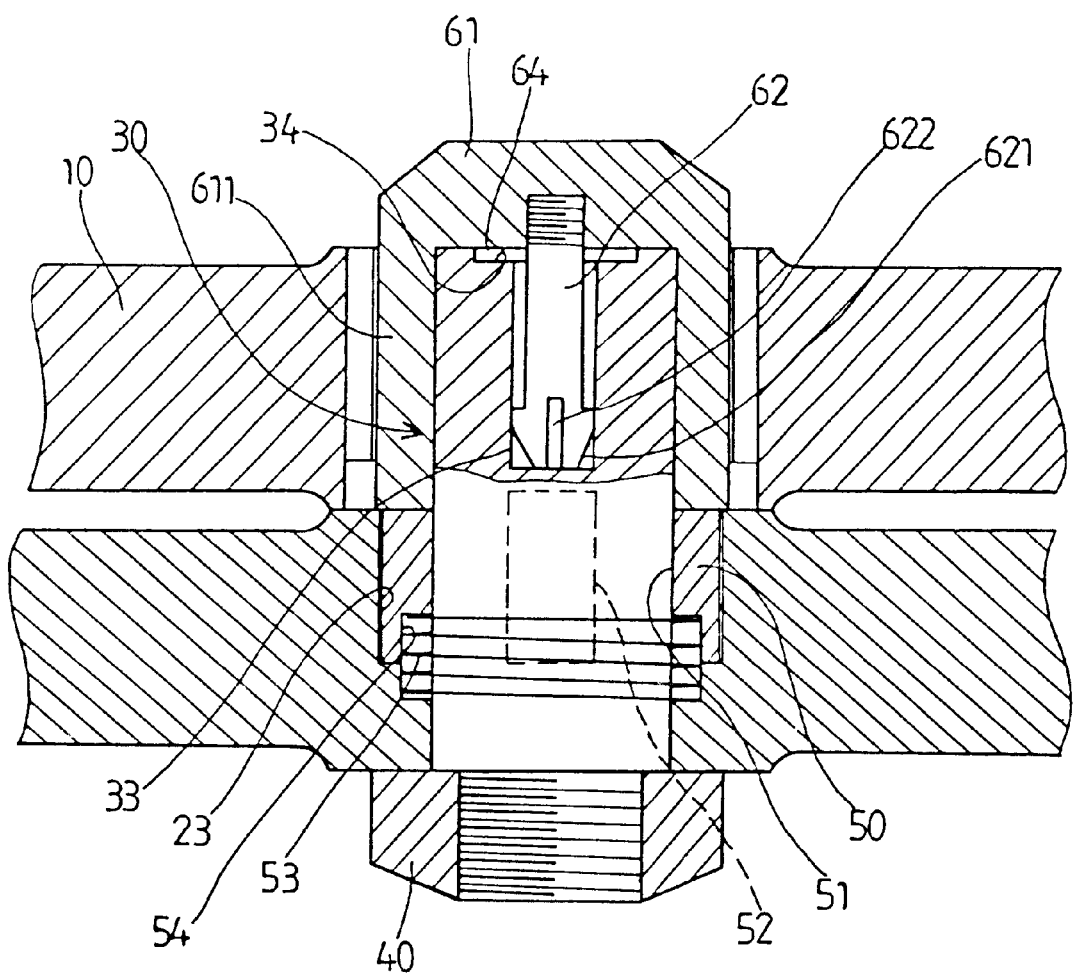
FIG. 7 is a cross sectional view to show the two arms are rotated with each other when the button is pushed.
Figure 8:
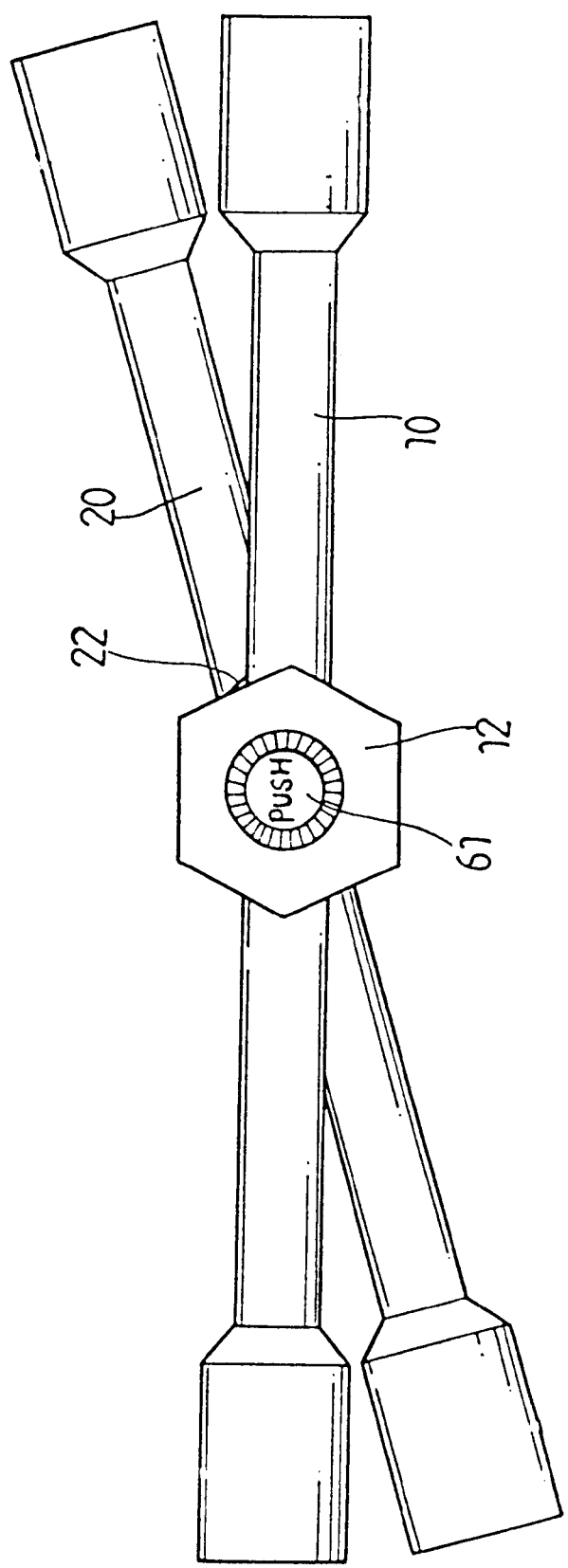
FIG. 8 shows a top view of the pivotable tool as shown in FIG. 7.

Referring to FIGS. 6 to 8, when pushing the button 61 downward, the two tongues 611 push the two lugs 52 and the collar 50 to press the spring 53 till the top surface of the collar 50 is flush with the top surface of the connection portion 22 of the second arm 20. The first arm 10 and the second arm 20 are then able to be rotated with each other to become a compact size which is convenient to be stored and carried.

While we have shown and described the embodiment in accordance with the present invention, it should be clear to those skilled in the art that further embodiments may be made without departing from the scope of the present invention.

What is claimed is:

1. A pivotal tool comprising:

a first arm having a first passage defined through a middle thereof, and two grooves defined in an inner periphery of said first passage of said first arm; said first arm including an annular sink recess formed therein and communicating with said first passage thereof;

a second arm having a second passage defined through a middle thereof, and two notches defined in an inner periphery of said second passage of said second arm;

a collar received in said second passage of said second arm, and including two lugs extending from an outer periphery of said collar and movably received in said notches of said second arm, and selectively and movably received in said grooves of said first arm;

a spring received in said second passage of said second arm, and engaged with said collar, for biasing said lugs of said collar to selectively engage into said grooves of said first arm;

a pin extending through said first passage of said first arm, and said second passage of said second arm, and extending through said collar, said pin including a first end having a recess formed therein and having a flange extended radially therefrom and received in said annular sink recess of said first arm, said flange including two concavities formed therein; and a button including a rod extended from an underside thereof and inserted into said recess of said pin, and including two tongues slidably extended through said concavities of said flange, and extended into said grooves of said first arm respectively, to contact with said lugs of said collar respectively;

said tongues of said button being engageable with said lugs of said collar to selectively disengage said lugs of said collar from said grooves of said first arm, and to force said lugs of said collar into said notches of said second arm, to release and to allow said first arm and said second arm to be rotated relative to each other, when said button is depressed toward said first arm and said second arm.

2. The pivotal tool according to claim 1, wherein said rod of said button includes a distal end having two hooks extended therefrom, and having a slit defined between said two hooks, and a ring mounted to said rod and having a hole which includes a diameter smaller than that of said two hooks.

* * * * *